(12) United States Patent
Saito

(10) Patent No.: US 7,833,003 B2
(45) Date of Patent: Nov. 16, 2010

(54) IN-MOLD DEGASSING STRUCTURE AND MOLD HAVING THE STRUCTURE

(75) Inventor: Teruhiko Saito, Yamagata (JP)

(73) Assignee: Kabushiki Kaisha Saito Kanagata Seisakusho, Yamagata (JP)

( * ) Notice: Subject to any disclaimer, the term of this patent is extended or adjusted under 35 U.S.C. 154(b) by 0 days.

(21) Appl. No.: 12/665,185

(22) PCT Filed: Jan. 23, 2009

(86) PCT No.: PCT/JP2009/051068

§ 371 (c)(1),
(2), (4) Date: Jun. 21, 2010

(87) PCT Pub. No.: WO2009/096331

PCT Pub. Date: Aug. 6, 2009

(65) Prior Publication Data

US 2010/0252713 A1 Oct. 7, 2010

(30) Foreign Application Priority Data

Jan. 28, 2008 (JP) .............................. 2008-016077
Jan. 19, 2009 (JP) .............................. 2009-009265

(51) Int. Cl.
*B29C 45/34* (2006.01)
(52) U.S. Cl. .................. 425/420; 425/546; 425/82; 425/DIG. 102
(58) Field of Classification Search ................. 425/420, 425/546, DIG. 60, DIG. 102, 812
See application file for complete search history.

(56) References Cited

U.S. PATENT DOCUMENTS 3,271,491 A * 9/1966 Mikkelborg ................. 264/102
3,885,618 A * 5/1975 Hodler ........................ 164/305

(Continued)

FOREIGN PATENT DOCUMENTS

EP       1782935 A1 *   5/2007

(Continued)

OTHER PUBLICATIONS

International Search Report for PCT/JP2009/051068.

*Primary Examiner*—Yogendra N Gupta
*Assistant Examiner*—Emmanuel S Luk
(74) *Attorney, Agent, or Firm*—Pearne & Gordon LLP

(57) ABSTRACT

Provided are an in-mold degassing structure, which acts by using no external control means, and a mold having that structure. The degassing structure comprises a sliding member (10) for receiving the pushing force of an elastic member from the bottom side, and a sliding member acceptor (20) for accepting the sliding member (10) slidably in the vertical direction. The sliding member (10) includes a vertical bottomed hole (12) communicating with a mold cavity and at least one side opening (13) communicating with the vertical bottom hole and opened to the side face. The sliding member acceptor (20) includes degassing ports (21) communicating in an initial state with the side opening (13) of the sliding member and closed when the sliding member is slid in a direction against the elastic member by the flow tip portion of the molten material. The degassing structure is mounted in the molten material flow passage or in the cavity near the trailing end of the molten material flow passage, thereby to degas the mold inside.

9 Claims, 3 Drawing Sheets

U.S. PATENT DOCUMENTS

| | | | |
|---|---|---|---|
| 3,892,508 A * | 7/1975 | Hodler | 425/135 |
| 3,991,971 A * | 11/1976 | Drake | 249/141 |
| 4,431,047 A * | 2/1984 | Takeshima et al. | 164/253 |
| 4,997,026 A * | 3/1991 | Ozeki et al. | 164/305 |
| 5,368,468 A * | 11/1994 | Boskovic | 425/556 |
| 5,626,887 A * | 5/1997 | Chou et al. | 425/129.1 |
| 5,874,116 A * | 2/1999 | Takano | 425/542 |
| 5,939,101 A * | 8/1999 | Green | 425/28.1 |
| 6,042,361 A * | 3/2000 | Murphy | 425/546 |
| 6,053,720 A * | 4/2000 | Winget et al. | 425/130 |
| 6,120,275 A * | 9/2000 | Winget et al. | 425/130 |
| 6,367,765 B1 * | 4/2002 | Wieder | 249/141 |
| 6,817,852 B2 * | 11/2004 | Lavallee | 425/116 |
| 6,871,831 B1 * | 3/2005 | Cuny et al. | 249/141 |
| 6,877,974 B2 * | 4/2005 | Puniello et al. | 425/116 |
| 7,331,561 B2 * | 2/2008 | Keesler | 249/141 |
| 2002/0100860 A1 * | 8/2002 | Wieder | 249/141 |
| 2004/0005371 A1 * | 1/2004 | Ahn et al. | 425/28.1 |

FOREIGN PATENT DOCUMENTS

| | | | | |
|---|---|---|---|---|
| JP | 60099626 A * | 11/1983 | | 425/577 |
| JP | 60127112 A * | 7/1985 | | 425/812 |
| JP | 62024922 A * | 6/1987 | | 425/546 |
| JP | 63-90552 U | 6/1988 | | |
| JP | 09-277310 A | 10/1997 | | |
| JP | 2000-015668 A | 1/2000 | | |
| JP | 2001030309 A * | 6/2001 | | |
| JP | 2003-170479 A | 6/2003 | | |
| JP | 2004-299085 A | 10/2004 | | |

* cited by examiner (A)

(B)

IN-MOLD DEGASSING STRUCTURE AND MOLD HAVING THE STRUCTURE

TECHNICAL FIELD

The present invention relates to a gas vent structure, provided for a mold used for the injection molding of various types of materials, such as plastics, ceramics, rubber and glasses, or for the die casting of metals or alloys, according to which, in an internal space (hereinafter also referred to as a cavity) of a mold filled with a molten material, a molded product will be less affected by gas generated by the molten material and residual air in the space, and thus, the external appearances of the finished product can be improved and the occurrence of defective products can be reduced. The present invention also relates to a mold incorporating this structure.

BACKGROUND ART

A mold provided by pairing a cavity plate and a core plate is employed for injection molding using various materials, such as a plastic (synthetic resin), a ceramic, a rubber, a glass and liquid crystal, or for die casting using a variety of materials, such as aluminum, zinc, tin and copper. When a molten material, such as plastic or metal, is injected into an enclosed space (hereinafter also referred to as a cavity), and is thereafter cooled in a predetermined manner, a finished product having a desired shape and structure is obtained. Generally, when a plastic, a ceramic, a rubber, a glass or a metal, that is, a raw material, is heated until it reaches an appropriate molding condition, a gas consonant with the material component is generated. The types and amounts of gases generated differ, depending on the heating temperatures, the material types, indirect materials to be added, etc., and also differ in accordance with mold cavity volumes.

Fine finishing is performed for the mold cavity, to improve the surface property and the external appearance of a finished product, and is also performed for the contact surfaces of the cavity plate and the core plate to ensure an airtight plate juncture. An elastic packing may also be positioned between the cavity and core plates, at their contact surfaces, to more simply provide an airtight juncture. Within the airtight mold cavity, gas components, such as those generated by a molten material and residual air, are present, as previously described. These gas components, which failed to be exhausted by an impelling force when a molten material was injected, prevent the molten material from spreading throughout the interior of the cavity, so that molding failures, such as short shots or surface irregularities, tend to occur. Further, when there is a gap in the juncture between the plate contact surfaces that permits gas components to be freely exhausted from the mold cavity, the molten material could enter the gap and create mold flashing or blowholes (unevenness) on the surface of the molded product, thereby degrading the product quality.

According to patent document 1, which is conventional art that provides, for the removal of the adverse affects of gas enclosed in the mold cavity, a gas vent path 11 that communicates with a gas vent hole 10, formed near the distal end of the mold cavity. A structure disclosed releases gas by opening and closing, using a slidable core member 12, the portion that connects the gas vent hole 10 and the gas vent path 11. In this case, a timer and another control mechanism are employed to selectively open and close the channel using the core member 12. The operating timing is determined based on the setup of a controller that is selected while taking into account the flow state of a molten material and other relevant conditions.

However, the flow state of a molten resin greatly differs, depending, for example, on the type of thermoplastic resin that is used as the molding material, the use of either a single resin or an alloy prepared by mixing a plurality of resins, the mold structure, the size of a finished product, the structure of the mold cavity, and whether or not an insert is used. For determining the setups for the timer and the other control means, the repetitious employment of trial and error is required by actually flowing molten resin, and this process imposes a greater load on operators responsible for molding to prevent the occurrence of defects. Further, when employing in die casting a specific type of metal or alloy, since the flow velocity of a molten material is remarkably high because of its low viscosity, adequate control for opening and closing of the channel is difficult.

Patent document 2 discloses that slide slots are formed from the surface of a cavity to the inside of a mold, and that a moving member is provided that is movable along the slide slots in the axial direction to form a gas release groove. The objective is the opening and closing of gas passage means that employs the forward or backward movement of the moving member, which occurs upon the contact of the leading end of a molten resin, to permit communication between the interior and exterior of the cavity via the gas release groove. However, detailed machining of a mold is requisite, and machining, maintenance, checking, repairing, etc., for the mold are complicated.

Patent document 3 discloses a structure wherein a gas vent valve is provided near the resin injecting portion at the bottom end of a cavity, and wherein, at the initial processing time, the gas vent valve 7 is opened and gas is released, and subsequently, when a pressure sensor located near a gate has detected a pressure rise in the resin, the gas vent valve is closed. According to this conventional art, in the initial period for injecting the molten resin, the gas vent valve is open, and when the pressure is increased in association with the flow state of the resin, the gas vent valve is closed to prevent leakage of the molten resin. However, for this conventional art, as well as for patent document 1, control means for opening or closing the gas vent valve, based on signals received from the pressure sensor, is additionally required.

Patent Document 1: JP-A-9-277310
Patent Document 2: JP-A-2000-15668
Patent Document 3: JP-A-2003-170479

SUMMARY OF INVENTION

Technical Problem

Objectives of the present invention are to provide a gas vent structure, used for the internal space of a mold, that is automatically actuated, without external control means being required, by receiving an impelling force from the leading end of a molten material that is flowing inside the mold, and to provide a mold that includes this gas vent structure. It should be noted that a mold employed for the present invention is not limited to a mold used for the injection molding of various types of plastic (synthetic resins), but includes a mold used for the injection into a space (cavity) of molten materials, such as ceramic, rubber, glass or liquid crystal materials, and a mold used for the die casting of various types of metals, such as aluminum, zinc, tin and copper.

Solution to Problem

The present invention according to claim 1 is an in-mold gas vent structure, comprising:

a sliding member 10 that receives, from an opposite side, an impelling force exerted by an elastic member and that includes a bottomed hole 12, formed in a direction in which a molten material flows, and at least one side opening 13, communicating with the bottomed hole and being open in a direction transecting the direction in which the molten material flows; and a sliding member acceptor 20 that slidably accepts the sliding member 10 in a direction parallel to the direction in which the molten material flows, and that includes a gas vent port 21, which communicates with the side opening 13 of the sliding member in the initial state, in which there is no pressure influence resulting from the flow of molten material, and is closed when the sliding member 10 is thereafter impelled inward, compressing the elastic member 14, by the leading end of the molten material, characterized by being suitable for being mounted in a space defined by a cavity plate and a core plate, or along a molten material flow passage connected to the space, or near the trailing end thereof.

The present invention according to claim 2 is the in-mold gas vent structure characterized in that the elastic member 14, for impelling the sliding member 10 toward the opposite side, is provided as either one component, or an assembly of components, selected from a helical spring, a leaf spring, a rubber-like elastic member, a fluid pressure actuator, etc.

The present invention according to claim 3 is the in-mold gas vent structure for claim 1, characterized by including a plurality of sets, each consisting of the side opening 13, formed in the sliding member 10, and the gas vent port 21, formed in the sliding member acceptor 20.

The present invention according to claim 4 is the in-mold gas vent structure characterized in that gas vent effects using the gas vent ports 21 are changeable in accordance with viscosity of the molten material.

The present invention according to claim 5 is the in-mold gas vent structure characterized in that at least either the gas vent ports 21 or the side openings 13 are employed as non-linear gas release passages.

The present invention according to claim 6 is the in-mold gas vent structure characterized in that the gas vent ports 21 and the side openings 13 define opening areas, so that the cross-sectional size for the opening areas changes, over time, in accordance with distances the sliding member moves.

The present invention according to claim 7 is the in-mold gas vent structure characterized by being suitable for being fitted into a recessed portion formed at a predetermined location in the mold.

The present invention according to claim 8 is a mold characterized in that:

a gas vent structure comprises a sliding member 10 that receives, from an opposite side, an impelling force exerted by an elastic member and that includes a bottomed hole 12, formed in a direction in which a molten material flows, and at least one side opening 13, communicating with the bottomed hole and being open in a direction transecting the direction in which the molten material flows, and a sliding member acceptor 20 that slidably accepts the sliding member 10 in a direction parallel to the direction in which the molten material flows, and that includes a gas vent port 21, which communicates with the side opening 13 of the sliding member in the initial state, in which there is no pressure influence resulting from the flow of molten material, and is closed when the sliding member 10 is thereafter impelled inward, compressing the elastic member 14, by the leading end of the molten material; and the gas vent structure is integrally formed in advance in a space defined by a cavity plate and a core plate, or along a molten material flow passage connected to the space or near the trailing end thereof.

The present invention according to claim 9 is the mold characterized by being integrally formed in advance with the gas vent structure, wherein gas vent effects using the gas vent ports 21 are changeable in accordance with viscosity of the molten material. In this case, at least either the gas vent port 21 or the side opening 13 is employed as a non-linear gas release passage, and the gas vent port 21 and the side opening 13 define an opening area, so that the cross-sectional size of the opening area can be changed, over time, in accordance with distances the sliding member moves.

Advantageous Effects of Invention

The in-mold gas vent structure of the present invention is mounted in a mold that is indispensable for injection molding, die casting, etc., and at a location, along a molten material flow passage extended farther from a gate, or near the trailing end of the passage, on which the leading end of the molten material exerts the impelling force. For determination of a specific mounting location, mold flow analysis using a computer can be performed. The gas vent structure includes: the sliding member 10, which is to be moved by the impelling force applied by the leading end of the molten material flow; and the sliding member acceptor 20, which is equipped with the elastic member 14 that exerts force against the sliding member, from the side opposite, in a direction towards the leading end of the molten material flow. The bottomed hole (vertical bottomed hole) 12 is formed in the front face of the sliding member that contacts the leading end of the molten material flow, and communicates with at least one of the side openings 13. Before the leading end of the molten material flow begins to impel the sliding member 10, the side openings 13 communicate with the gas vent ports 21 that are formed in the sliding member acceptor 20, thereby freely releasing gas in the cavity to the outside without any difficulty. When injecting of the molten material in the cavity is continued, and when the leading end of the molten material flow impels the sliding member 10, driving the sliding member against the elastic member 14, the gas vent ports 21 are closed, and the flow of the molten material is completely blocked.

It is well known that in the mold the flow speed of a molten material differs greatly, depending on whether the material is a plastic, a metal or alloy, a ceramic, a rubber, etc. According to the gas vent structure of the invention, the release of gases is enabled until the leading end of the molten material approaches the sliding member, and almost all of the gases will have been released by the time the leading end of the molten material reaches the sliding member. Therefore, the sliding member 10 should be forced to move by the leading end of the molten material flow to prevent the subsequent flow of the molten material. The flow speed in this case varies; for example, for a low viscosity metal, such as aluminum or an aluminum alloy, the flow is rapid, and for a plastic, ceramic, rubber, etc., the flow is comparatively slow. Further, when a plastic, metal or rubber material is employed, the passage closing timing differs in accordance with the basic material and indirect materials to be added, and the usage, the amount of material required by the size of a product, etc. However, in this invention, the passage closing timing used for the gas vent structure is directly determined, based on the effect produced by the leading end of the flowing, molten material, i.e., by a so-called self-operation . Therefore, the gas vent structure does not need to be adjusted for use in consonance with the type of material employed and the configuration and size of a product, and no artificial or complicated control means, etc., is required, In the processing, from the start of the injection of the molten material into the mold cavity until the arrival of the leading end of the molten material at the gas vent structure, the molten material flow passage and the size of the internal space are substantially reduced as the molten material flows in, and accordingly, the gas mixture, consisting of the residual air and the generated gas, is externally released without difficulty. Therefore, the injecting of the molten material, such as a resin or a metal, can continue for the cavity with no difficulty. Then, when the molten material flow reaches the location where the gas vent structure is mounted, as previously described, the side openings 13 of the sliding member 10 and the gas vent ports 21 of the sliding member acceptor 20 are displaced from each other, and in a brief time, the molten material flow passage is closed. Thus, leakage of the molten material can be appropriately prevented. As a result, the occurrence of product defects, such as short shots, blowholes, mold flashes, is greatly reduced, and productivity is improved.

This in-mold gas vent structure can be prepared in advance as a standard item, having typical overall dimensions. Further, during a mold fabrication process, a recessed mounting portion can be prepared in a mold at a predetermined location, and thereafter, the standard item can be fitted in this mounting portion and secured using screws, for example. For manufacturing the body of a mold, a process can be separately performed using a conventional method, except for the formation of the recessed mounting portion. Then, a gas vent structure of this invention, of the above described standard type, can be detachably fitted into the recessed mounting portion that has been prepared. Therefore, since the gas vent structure can be prepared in advance as a separate unit, and can be mounted in a mold having a recessed mounting portion, operating efficiency can be improved, and material costs and the number of manufacturing steps can be reduced. When the gas vent structure is not required because of the type and the property of a molten material used for molding, a dummy (false member) having the same overall dimensions can be formed and securely mounted in the recessed portion.

When the manufacture of a new mold is required because, for example, a product model has been changed, such a detachable gas vent structure as the structure of this invention can be removed from the old mold and reused, by being mounted in the recessed mounting portion of a new mold that was prepared, thereby reducing the required resources, labor and costs, and increasing the economical effect. Furthermore, for a mold for which the above described event need not be taken into account and continuous use for a long time with no alteration is anticipated, the gas vent structure for the above described arrangement can be integrally formed with the mold at the beginning.

REFERENCE SIGNS LIST

10: sliding member
12: bottomed hole (vertical bottomed hole)
13: side opening (side hole)
14: elastic member (compression spring)
20: sliding member acceptor
21: gas vent port
A: gas vent structure
R: molten material flow direction
D: sliding member movement direction

DESCRIPTION OF EMBODIMENT

Figure 1:
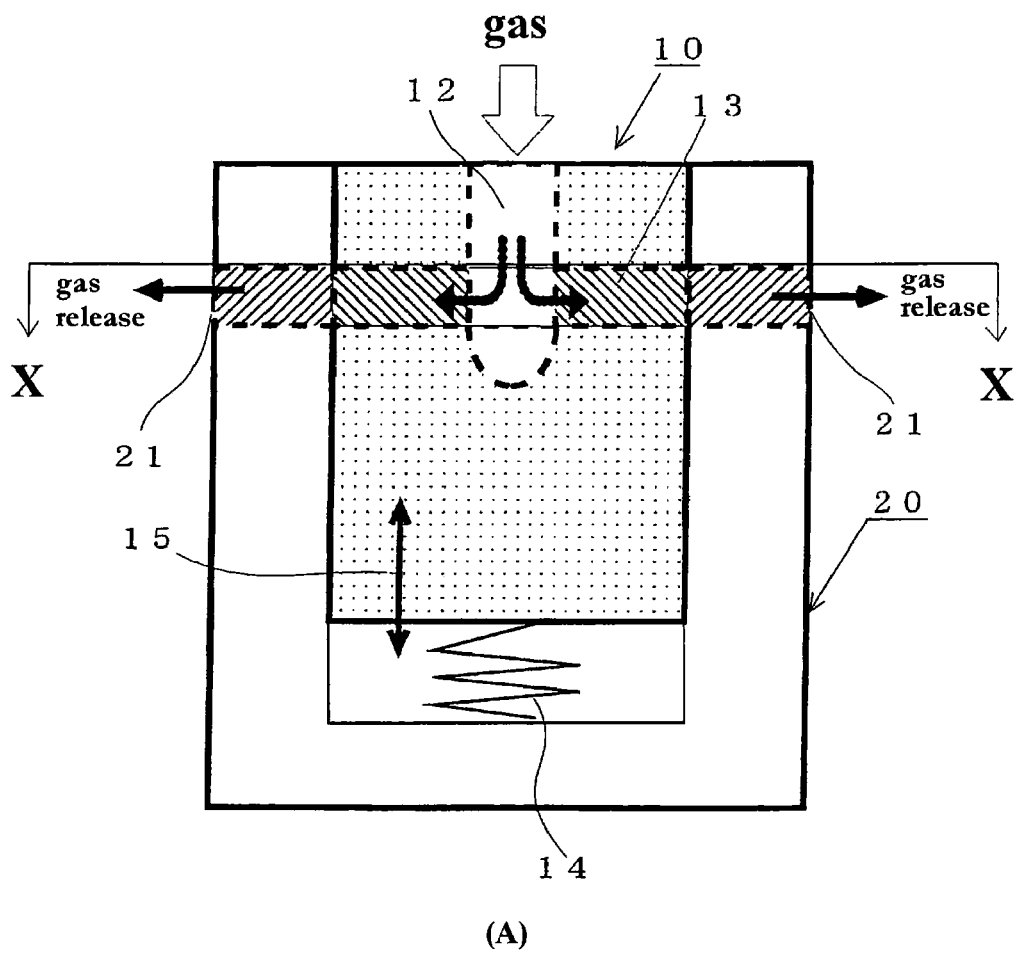
FIG. 1 is a plan view (A) and an X-X cross-sectional view (B) of an example structure for an in-mold gas vent structure according to the present invention.
Figure 1:
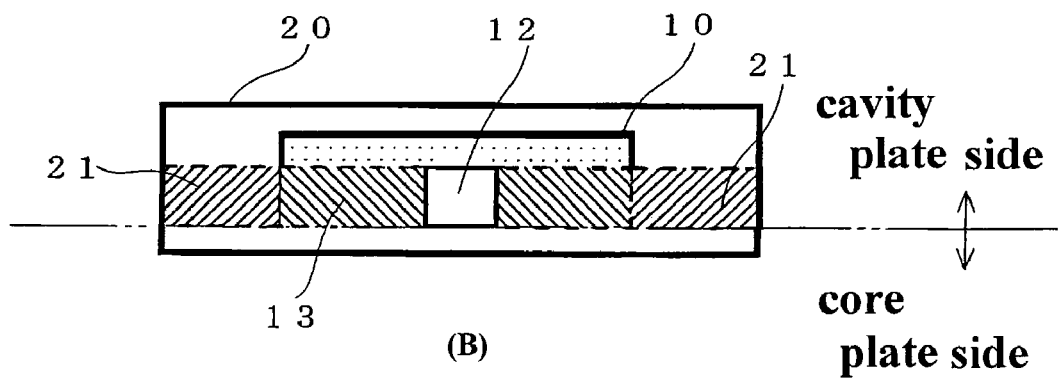

A preferred embodiment of the present invention for a gas vent structure that is detachable from a mold will now be disclosed, while referring to accompanying drawings. FIG. 1 is a plan view (A) and an X-X fragmentary cross-sectional view (B) illustrating the preferred embodiment for the in-mold gas vent structure of the present invention. As is apparent from diagram (A), the gas vent structure of this invention includes a sliding member 10 and a sliding member acceptor 20. Since the gas vent structure of this invention is a vertical type, on the layout of the drawings, a bottomed hole is represented as a vertical hole and the direction in which the sliding member is moved is the vertical direction, as indicated by an up down arrow 15; however, the gas vent structure of this invention is either a transverse type or an oblique type, the bottomed hole is directed transversely or obliquely, and the sliding direction is either the horizontal or the oblique direction. This also applies for the following direction.

The upper end of the sliding member 10 is formed to receive gas that flows from above in the drawing, as indicated by a thick, white arrow, and the leading end of the molten material that flows in the same direction. In the upper end of the sliding member 10, a vertical bottomed hole 12 having a semi-spherical bottom is formed to permit passing of a gas mixture, consisting of air and generated gas, before the leading end of a molten resin, etc., approaches the sliding member 10. Furthermore, at least one side opening 13, for communicating with the bottomed hole 12, is formed at a position a little before the lower end of the bottomed hole 12. The expressions employed here, such as "vertical" and "upper", refer merely to the states illustrated in the accompanying drawings, and do not relate to the positioning and arrangement for actual use. In this embodiment, the side opening 13 is formed on either side, and in consonance with the usage and a material employed for injection, only one or three or more side openings may be formed. Since the vertical bottomed hole 12 and the side openings 13 are provided inside the sliding member 10, these components are shown by dashed lines.

The sliding member acceptor 20 has a recessed portion, as shown in the X-X fragmentary cross-sectional view in FIG. 1(B), in which the sliding member 10 is held in contact with the right and left faces and the rearmost face in the diagram (bottom face) to be slidable along a guide groove, a slip-off prevention frame, etc. (none of them shown). The space for permitting the further movement of the sliding member 10 is defined in the portion of the sliding member acceptor 20, below the lower end of the sliding member 10 shown in the drawing, and an elastic member 14 is arranged in this portion to impel the sliding member 10 upward. For the elastic member 14, one of either a helical spring, a leaf spring, a rubber-like elastic member or a fluid pressure actuator, or an assembly of several of them, can be employed.

Therefore, in the initial state of the sliding member 10, to which no external force has been applied, the sliding member 10 is positioned above by the elastic member 14, as shown in FIG. 1(A), and the side openings 13 are communicating with gas vent ports 21. It should be noted that, as indicated by a long dashed double-short dashed line in FIG. 1(B), the sliding member 10 and the sliding member acceptor 20 are parted along an appropriate plane, and it is desired that one segment be mounted on the cavity plate side and the other segment be mounted on the core plate side. As a result, the side openings 13 and the gas vent ports 21 can be formed as grooves by slotting, instead of by piercing. In the following disclosure, assume that the segment on the cavity plate side and the segment on the core plate side are aligned to provide one assembly.

Referring to the drawings, the gas vent ports 21, which at least partially engage the side openings 13 of the sliding member 10, are formed in the sliding member acceptor 20, one on either side, consonant with the number of the side openings 13 in the sliding member 10. As described above, the gas vent ports 21 on the individual sides of the sliding member acceptor 20 communicate with the respective side openings 13 of the sliding member 10 during a period in which the elastic member 14 is impelling the sliding member 10 upward. Therefore, in the process for injecting a molten material through the nozzle of an injection molding machine, a die casting machine, etc., various gases, such as residual air and gases, generated by the molten material, are externally removed from the cavity through a channel leading from the vertical bottomed hole 12 of the sliding member and thence to the side openings 13 and the gas vent ports 21 of the sliding member acceptor 20. As a result, the occurrence is reduced of molding failures, such as short shots, which tend to occur in cases wherein the presence of gases interrupts the flow of a molten material, preventing the material from completely reaching the terminal end of the cavity, the occurrence of degraded products, such as products that are burned, or the occurrence of blowholes. In the drawings, the gas vent ports and the side openings are formed on the same plane; however, the gas vent ports may open upward or downward, three-dimensionally, and communicate with the side openings.

Figure 2:
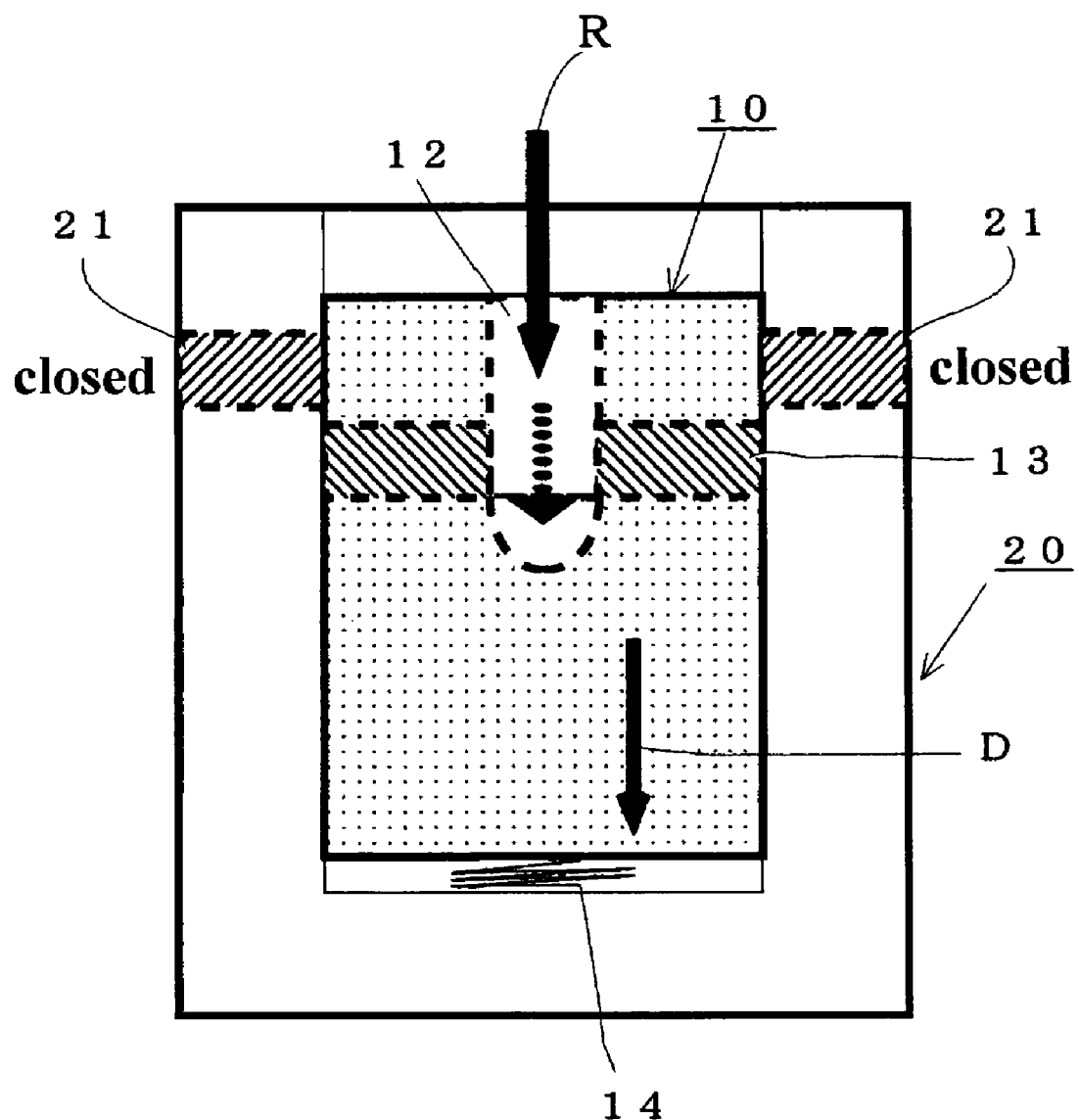
FIG. 2 is a plan view of the operating state of the in-mold gas vent structure according to the present invention.

FIG. 2 is a drawing illustrating the state wherein the leading end of a molten material, such as a resin, flowing from the top, as indicated by an arrow R, has reached the in-mold gas vent structure in FIG. 1. As a result, the sliding member 10 begins to move downward, as indicated by an arrow D, and compresses the elastic member 14 located under the lower face of the sliding member 10, so that the channel open state, for the side openings 13 of the sliding member 10 and the gas vent ports of the sliding member acceptor 20, is shifted to the channel closed state. Therefore, the flow or leakage of the molten material is completely prevented, and satisfactory injection results can be anticipated. It should be noted that when the in-mold gas vent structure of this invention is employed, by being separated into the cavity plate side and the core plate side, as indicated by a long dashed double-short dashed line in FIG. 1(B), the number of grooves, formed by slotting for the side openings 13 and the gas vent ports 21, and the widths and the depths of the grooves may differ between the cavity plate side and the core plate side, and the flow resistance can be variously adjusted in accordance with the properties of molten materials. Further, in FIG. 1(B), the upper side is defined as the cavity plate side and the lower side is defined as the core plate side, but these sides may also be reversed.

When as described above the sliding member 10 is impelled inward, compressing the elastic member 14, by the leading end of the molten material, the gas vent ports 21 are closed and the flow of the molten material is completely blocked. When the molten material is a plastic, a ceramic or a rubber, the flow speed is comparatively low and outflow of the material does not occur. However, since a low-viscous metal, such as aluminum or an aluminum alloy, has a high flow speed, the metal might flow out with various gases, such as residual air and gases that are generated by the molten material during the molten material injection process, which is performed while the side openings 13 and the gas vent ports 21 are communicating with each other. Therefore, it is preferable that effects attributable to gas release through the gas vent ports 21 be changeable in consonance with the viscosity of a molten material.

When a gas release passage for, at the least, either the gas vent ports 21 or the side openings 13 is formed in a non-linear shape, such as a hooked shape or a nearly triangular shape that is tapered forward, the amount of gas released to the exterior can be controlled, and a low-viscous molten material having a high flow speed can be prevented from flowing out. Furthermore, when the gas vent port 21 and the side opening 13 define an opening area, the cross-sectional size of which changes over time in consonance with the distance in which the sliding member 10 is moved, the same effects as described above can be obtained. The side openings 13 may be openings having different inner diameters, such as two openings that provide a large flow rate and a small flow rate, or three openings that provide a large flow rate, a medium flow rate and a small flow rate. In this case, the openings that communicate with the gas vent port opposite are changed based on the distance moved by the sliding member, and, depending on the communication state, a connection to the exterior is established, i.e., the amount of gas released is changed over time. Finally, the sliding member reaches the channel closing area where no opening is available, the gas release channel is completely closed. The number of openings, their sizes, the intervals of adjacent openings, etc., can be determined based on molding conditions, such as heating temperature and dwell time, while taking into account the viscosity of a molten material, the amount of gas generated, etc.

Further, either the gas vent ports 21 or the side openings 13 may also be provided as multiple openings having different sizes, and with this structure, the time-transient control for a gas release volume can be performed, i.e., the cross-sectional size of the actual opening area, which is determined by the size or the ratio of an opening that is aligned with an opening on the other side, is changed over time in accordance with the distance the sliding member 10 is moved with respect to the sliding member acceptor 20, and the gas release volume is reduced. The opening size, etc., can be determined by considering the viscosity of a molten material, the gas that will be generated, etc., included in the molding conditions for the molten material.

In this embodiment, gas release or channel closing is controlled by bringing the side openings 13, along the sliding face of the sliding member 10, into alignment with, or separated from, the openings of the gas vent ports 21. However, to control gas release or channel closing, a round hole having a stepped or tapered interior, for example, may also be formed in the sliding member, and a round bar may be projected from the bottom of the sliding member acceptor 20. With this arrangement, in the initial state of the sliding member 10, since the distal end of the round bar on the sliding member acceptor 20 is positioned in the largest diameter portion of the round hole, the gas components freely pass through. However, when, as shown in FIG. 2, a leading end R of the molten material flow starts to impel the sliding member 10, the narrow portion or tapered portion of the round hole of the descending sliding member 10 closely engages the round bar projecting from the sliding member acceptor, and the channel is closed. With this arrangement, the gas in the mold is moved in the direction of travel of the sliding member 10, and is discharged.

Figure 3:
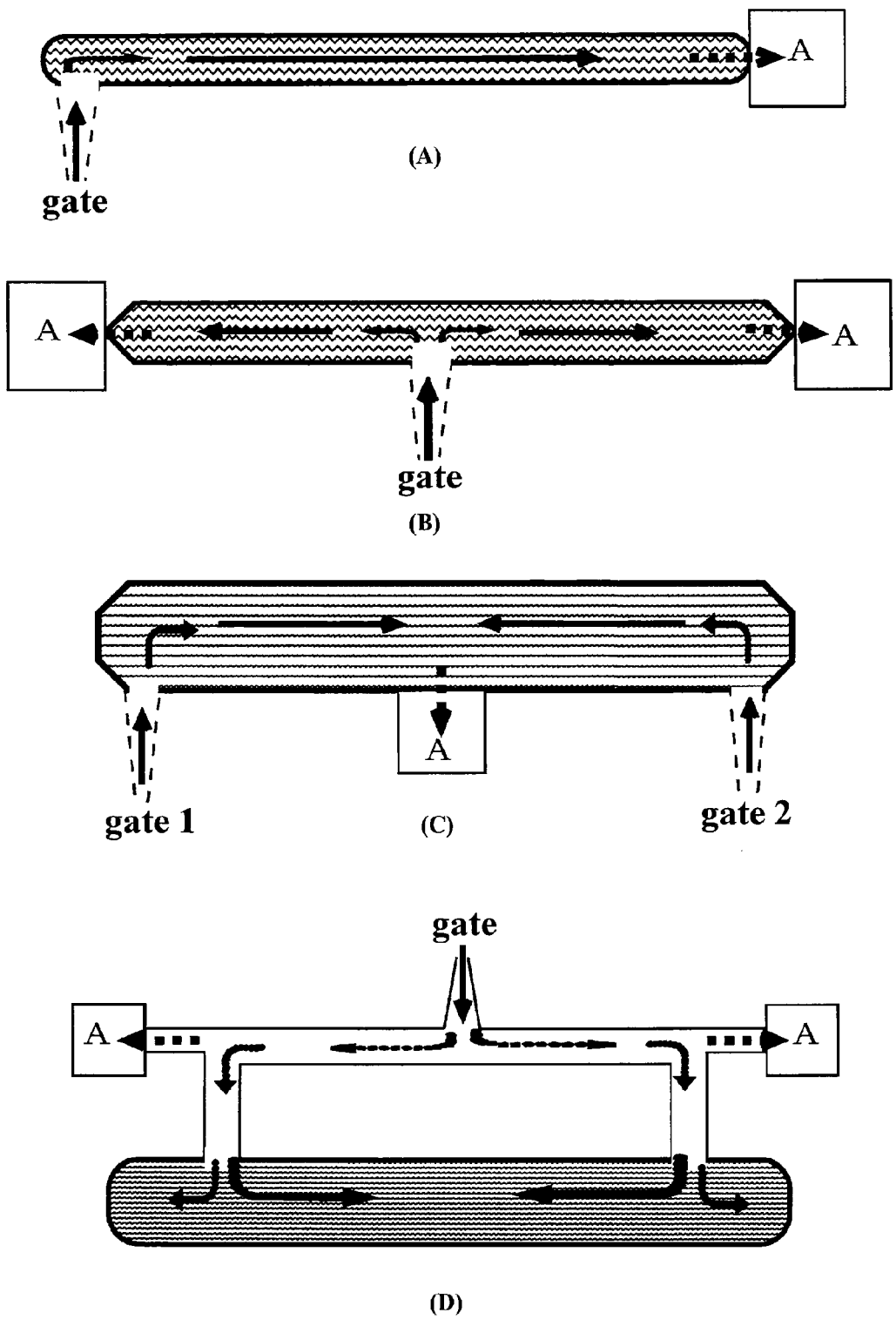
FIG. 3 is a conceptual diagram illustrating examples (A), (B), (C) and (D) showing the locations for mounting the in-mold gas vent structure of the present invention.

FIG. 3 is a schematic diagram illustrating examples wherein the in-mold gas vent structure A of this invention is arranged in a mold, and in the drawing, arrows depicted with continuous lines indicate directions in which a molten material flows, while arrows depicted with dashed lines indicate directions in which gas flows. An example in FIG. 3(A) is for the injection of a molten material from the left end gate, which is a single gate. This is the simplest structural example, wherein the molten material moves only in one direction, showing that the gas vent structure A is arranged near the terminal end in the direction in which the molten material flows. FIG. 3(B) shows an example wherein the flow of the molten material branches at a single gate, and moves in two directions, to the left and right, and the gas vent structure A. is arranged at the individual terminal ends in the direction of flow of the molten material. FIG. 3(C) shows an example for the employment of multiple (two) gates mainly for molding a large product, and showing that one gas vent structure A is located at the merging point of molten material flows that enter from a left gate 1 and a right gate 2.

FIG. 3(D) shows an example wherein a molten material is branched at a single gate to fill a cavity with a molten material from two directions. In this example, two gas vent structures A are located, in the direction in which the molten material flows, at the distal ends where the molten material flow passage is bent. With this structure, during a period until the leading ends of the molten material, branched in two directions, reach the gas vent structures A, the gas components in the molten material flow passage and in the cavity are impelled and externally released. When the molten material has a low viscosity and a high flow speed, high gas release effects can be provided until the leading ends of the molten material flow strike bottomed holes 12, and because of the Venturi effect, it can be anticipated that afterwards, the flow passage and the cavity will be maintained under a low pressure (negative pressure). As a result, the injection of the material into the cavity becomes easier, and the molding operation can be satisfactorily performed. Since the leading ends of the molten material strike the bottomed holes 12 and move the sliding member 10, the gas vent ports 21 are closed as in the above described embodiment, and the molten material then fills the cavity.

As in these specific examples, when the direction of flow of a molten material injected through a gate is identified, and the gas vent structure A of the present invention is located at the terminal end of the flow by, if available, using a mold flow analysis supported by a computer, a smooth and ideal form of a molten material can be maintained. Therefore, molding failures can be greatly reduced, and an improvement in the efficiency of the molding process and reductions in time, materials, labor and energy can be realized.

INDUSTRIAL APPLICABILITY

The in-mold gas vent structure of the present invention is a simple structure that includes a sliding member and a sliding member acceptor, and appropriately performs self-actuation, with no delay, when the leading end of the molten material flow reaches the gas vent structure. According to the in-mold gas vent structure, the sliding member serves as a sensor that determines an actuating timing, and also as a control mechanism, thereby performing so-called self-control. Therefore, not only a sensor for detecting a phenomenon, but also an operation driver, such as solenoid means or a hydraulic cylinder, for driving valves, is not required. Thus, the present invention is useful, while taking into account the materials to be employed, the processing period time and the manufacturing costs, etc., and further, since processing time lags can almost be disregarded, molding failures due to gas in cavities can be greatly reduced.

As described above, the in-mold gas vent structure of this invention includes the sliding member, a compression spring serving as an elastic member and the sliding member acceptor. Therefore, so long as slotting for the sliding member and the sliding member acceptor, and machining for the slide portion to ensure smooth sliding, are performed at the initial precision, gas is released accurately through self-operation and without any time delay. It should be noted that the accurate positioning for mounting the gas vent structure in a mold can be determined in accordance with predetermined conditions, such as the shape and size of a cavity, the number of gates and a molten material to be employed, and based on a molten flow analysis supported by a computer.

Furthermore, according to the present invention, since the in-mold gas vent structure is available as a separate item, this structure can be mounted not only in a new mold, but also in a conventional mold that has been modified by forming a recessed mounting portion at an appropriate location. Thus, a large increase in the molding efficiency can be anticipated. And when a gas vent structure is no longer required for a mold, this mechanism can simply be removed as an individual item, and can be employed for another mold. Further, for economical reasons and for production time reasons, the gas vent structure of the present invention, which can be repetitiously employed, is preferable, especially for a mold, called a fad mold, that is designed either to follow a current trend or to satisfy demands for only a short term, because the fabrication costs for such a mold should be as low as possible. Furthermore, for continuous use over a long period, a gas vent structure having the above described structure may be integrally formed with a mold from the beginning, since economic efficiency is increased in this way.

The invention claimed is
1. An in-mold gas vent structure, comprising:
   a sliding member that receives, from an opposite side, an impelling force exerted by an elastic member and that includes a bottomed hole, formed in a direction in which a molten material flows, and at least one side opening, communicating with the bottomed hole and being open in a direction transecting the direction in which the molten material flows; and
   a sliding member acceptor that slidably accepts the sliding member in a direction parallel to the direction in which the molten material flows, and that includes a gas vent port, which communicates with the side opening of the sliding member in the initial state, in which there is no pressure influence resulting from the flow of molten material, and is closed when the sliding member is thereafter impelled inward, compressing the elastic member, by the leading end of the molten material,
   characterized by being suitable for being mounted in a space defined by a cavity plate and a core plate, or along a molten material flow passage connected to the space, or near the trailing end thereof.

2. The in-mold gas vent structure according to claim 1, characterized in that the elastic member, for impelling the sliding member toward the opposite side, is provided as either one component, or an assembly of components, selected from a helical spring, a leaf spring, a rubber-like elastic member, or a fluid pressure actuator.

3. The in-mold gas vent structure according to claim 1 or 2, characterized by including a plurality of sets, each consisting of the side opening, formed in the sliding member, and the gas vent port, formed in the sliding member acceptor.

4. The in-mold gas vent structure according to claim 1 or 2, characterized in that gas vent effects using the gas vent ports are changeable in accordance with viscosity of the molten material.

5. The in-mold gas vent structure according to claim 4, characterized in that at least either the gas vent ports or the side openings are employed as non-linear gas release passages.

6. The in-mold gas vent structure according to claim 4, characterized in that the gas vent ports and the side openings define opening areas, so that the cross-sectional size for the opening areas changes, over time, in accordance with distances the sliding member moves.

7. The in-mold gas vent structure according to claim 1 or 2, characterized by being suitable for being fitted into a recessed portion formed at a predetermined location in the mold.

8. A mold characterized in that:
a gas vent structure comprises
a sliding member that receives, from an opposite side, an impelling force exerted by an elastic member and that includes a bottomed hole, formed in a direction in which a molten material flows, and at least one side opening, communicating with the bottomed hole and being open in a direction transecting the direction in which the molten material flows, and
a sliding member acceptor that slidably accepts the sliding member in a direction parallel to the direction in which the molten material flows, and that includes a gas vent port, which communicates with the side opening of the sliding member in the initial state, in which there is no pressure influence resulting from the flow of molten material, and is closed when the sliding member is thereafter impelled inward, compressing the elastic member, by the leading end of the molten material; and
the gas vent structure is integrally formed in advance in a space defined by a cavity plate and a core plate, or along a molten material flow passage connected to the space or near the trailing end thereof.

9. The mold according to claim 8, characterized by being integrally formed in advance with the gas vent structure, wherein gas vent effects using the gas vent ports are changeable in accordance with viscosity of the molten material.

* * * * *